(12) United States Patent
Kancham

(10) Patent No.: US 12,443,725 B2
(45) Date of Patent: Oct. 14, 2025

(54) ASSESSING STATUS CHANGES CAUSED BY MODIFICATIONS TO SOFTWARE APPLICATIONS

(71) Applicant: Capital One Services, LLC, McLean, VA (US)

(72) Inventor: Naveen Kumar Kancham, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 107 days.

(21) Appl. No.: 18/405,640

(22) Filed: Jan. 5, 2024

(65) Prior Publication Data

US 2025/0225252 A1 Jul. 10, 2025

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
CPC .......... G06F 21/577; G06F 2221/033
See application file for complete search history.

(56) References Cited

U.S. PATENT DOCUMENTS

| | | | | |
|---|---|---|---|---|
| 2012/0137369 | A1* | 5/2012 | Shin | G06F 21/577 726/25 |
| 2012/0188996 | A1* | 7/2012 | Roka | G06F 16/178 370/350 |
| 2019/0370468 | A1* | 12/2019 | Soby | G06F 21/57 |
| 2019/0379699 | A1* | 12/2019 | Katragadda | H04L 63/1425 |
| 2021/0092105 | A1* | 3/2021 | Yu | H04L 67/54 |
| 2023/0036730 | A1* | 2/2023 | Casa | G06Q 20/363 |

* cited by examiner

*Primary Examiner* — El Hadji M Sall
(74) *Attorney, Agent, or Firm* — Foley & Lardner LLP

(57) ABSTRACT

Methods and systems are described herein for assessing status changes caused by modifications to software applications. The system may identify a status associated with an application. For example, the status may be based on a first length of time that the application is inactive based on a current number of vulnerabilities. The system may detect a modification of a component of the application and may determine, using a machine learning model, a predicted number of vulnerabilities introduced into the application by the modification. The system may identify an updated status associated with the application based on the predicted number of vulnerabilities. The system may determine a difference between the status and the updated status and based on the difference, may cause the modification to cease.

20 Claims, 7 Drawing Sheets

200

ASSESSING STATUS CHANGES CAUSED BY MODIFICATIONS TO SOFTWARE APPLICATIONS

BACKGROUND

Modern software applications typically include a myriad of different components serving different functions within the larger system. These components may include user interfaces, databases, application programming interfaces (APIs), data processing units, security modules, and network communication layers. The architecture of such applications may have a modular design, allowing for flexibility and scalability. This modular approach enables individual components to be updated, added, removed, or replaced. However, changes to an individual component may negatively impact the overall software application. For example, an addition of a new component may introduce new security threats or may jeopardize the health of the overall software application. Certain variations in the health of the software application may have severe ramifications on the software application or on other aspects of the overall system. This technical limitation may present an inherent problem with attempting to modify software applications with modular components.

SUMMARY

Methods and systems are described herein for facilitating assessment of the effects of modifications to software applications. In particular, the methods and systems facilitate assessment of status changes of software applications caused by modifications to the software applications.

Existing systems lack the technical ability to assess the effects of modifications to software applications. For example, existing systems may enable the modification of software applications, for example, with the addition or removal of various components. However, these modifications may jeopardize the functionality or security of the software application. Without a system of accounting for the effects of such modifications, modifications to software applications may have unknown consequences. Furthermore, knowledge of the effects of a modification does not suffice without an understanding of the context surrounding the software application. Certain software applications may have greater leeway for fluctuations in functionality, while others may not be permitted to stray from peak performance. Thus, the effects of modifying a software application must be assessed in view of the application's role in the overall system.

To overcome these technical deficiencies in attempting to modify software applications with modular components, methods and systems disclosed herein assess the status of a software application before and after a modification is made. The status change may reflect an impact of the modification on the application's vulnerabilities and ability to recover from disruptions to normal operation. The methods and systems may compare the status change to a threshold that adapts to the specific context of the software application. For example, the threshold may be smaller for critical (e.g., outward-facing) applications, restricting the amount that the status is permitted to change. The threshold may be larger for non-critical (e.g., internal) applications, allowing for greater fluctuations in status. Accordingly, if a status change exceeds a threshold specific to the context of a particular software application, the methods and systems may employ measures to cease operation of the application, cease the modification, or take other remedial measures. This enables software applications to undergo modular modifications without unknown risk to the overall system and to contextualize the risk introduced by modifications to the application.

In some aspects, a status assessment system may identify a status associated with a software application. The initial status may be identified based on current vulnerabilities, a first length of time the software application is inactive following a disruption to normal operation, or other factors. The status assessment system may detect a modification to the software application. For example, the modification may be an addition of a component to the software application. The status assessment system may determine a predicted number of vulnerabilities introduced into the software application by the modification. To do so, the status assessment system may use a machine learning model trained to predict vulnerabilities introduced by modifications to software applications based on historic data. The status assessment system may then identify an updated status associated with the software application after the modification. The updated status may be based on the predicted number of vulnerabilities, a second length of time that the software application is inactive following the disruption to normal operation, or other factors. The status assessment system may determine a status threshold specific to the type of the software application. For example, a first type of software application having a lower importance or criticality (e.g., an internal application) may correspond to a larger threshold, allowing for more leeway of status changes. A second type of software application having a higher importance or criticality (e.g., an outward-facing application) may correspond to a smaller threshold, thus restricting the status change that is permitted. In response to determining that the status change satisfies the status threshold, the status assessment system may cause the software application to cease the modification.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
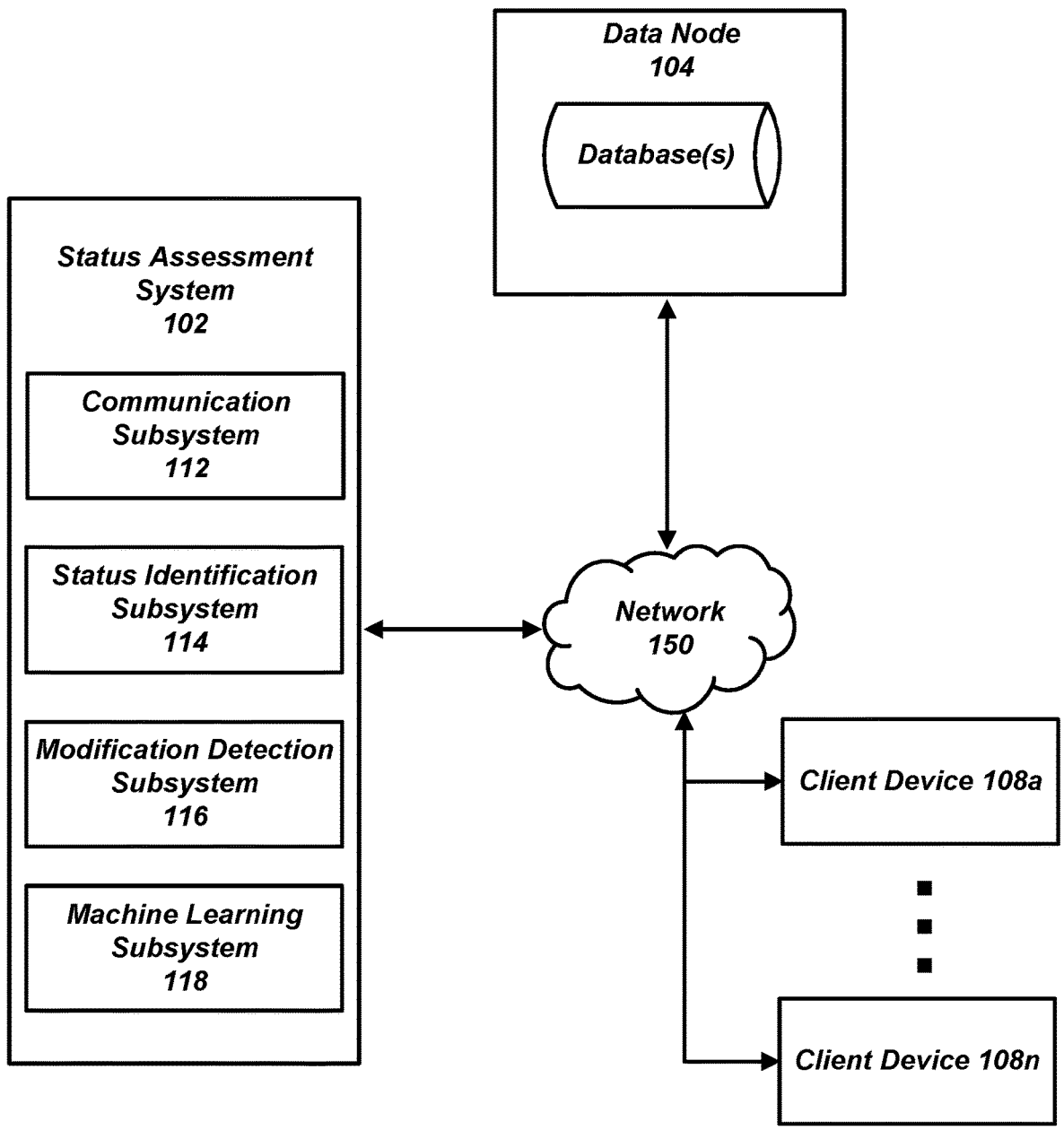
FIG. 1 shows an illustrative system for facilitating assessment of status changes caused by modifications to software applications, in accordance with one or more embodiments.

FIG. 1 shows an illustrative system 100 for facilitating assessment of status changes caused by modifications to software applications, in accordance with one or more embodiments. System 100 may include status assessment system 102, data node 104, and client devices 108a-108n. Status assessment system 102 may include communication subsystem 112, status identification subsystem 114, modification detection subsystem 116, machine learning subsystem 118, and/or other subsystems. In some embodiments, only one client device may be used, while in other embodiments, multiple client devices may be used. The client devices 108a-108n may be associated with one or more users. The client devices 108a-108n may be associated with one or more user accounts. In some embodiments, client devices 108a-108n may be computing devices that may receive and send data via network 150. Client devices 108a-108n may be end user computing devices (e.g., desktop computers, laptops, electronic tablets, smartphones, and/or other computing devices used by end users). Client devices 108a-108n may output (e.g., via a graphical user interface) run applications, output communications, receive inputs, or perform other actions.

Status assessment system 102 may execute instructions for assessing status changes caused by modifications to software applications. Status assessment system 102 may include software, hardware, or a combination of the two. For example, communication subsystem 112 may include a network card (e.g., a wireless network card and/or a wired network card) that is associated with software to drive the card. In some embodiments, status assessment system 102 may be a physical server or a virtual server that is running on a physical computer system. In some embodiments, status assessment system 102 may be configured on a client device (e.g., a laptop computer, a smartphone, a desktop computer, an electronic tablet, or another suitable client device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server or a virtual server that is running on a physical computer system. In some embodiments, status assessment system 102 and data node 104 may reside on the same hardware and/or the same virtual server/computing device. Network 150 may be a local area network, a wide area network (e.g., the internet), or a combination of the two.

In some embodiments, status assessment system 102 (e.g., status identification subsystem 114) may identify a status associated with a software application. In some embodiments, a status may be an assessment of an overall state of performance, stability, and reliability. The status may encompass various aspects of the application's operation, including how efficiently it processes tasks, its response time, its ability to remain functional and accessible under different conditions, or other capabilities. The status of an application may provide insights into potential issues or inefficiencies that could affect user experience or system performance. The status may also indicate the need for maintenance or updates to ensure optimal functionality.

In some embodiments, a status may be assessed based on categorical changes. For example, a scale may include categories such as critical, marginal, optimal, or other categories. A status of a software application may be assessed based on which category the software application fits into and whether the software application falls into a different category after modification. In some embodiments, the status may be represented by a score or index. For example, the status may be a score having a scale that ranges from zero (e.g., for a nonexistent application) to 1,000 (e.g., for a software application having no deficiencies) or another upper limit. In some embodiments, the status may be calculated as a numerical score within this range such that changes in status may be assessed numerically. Status identification subsystem 114 may calculate a numerical score based on a characteristic of the software application or based on a combination of factors.

For example, status identification subsystem 114 may calculate the score based on functionality of the software application. Functionality may encompass the range of operations and tasks an application can perform and the features it offers to its users, such as data processing, content creation, communication, or analysis, depending on the nature of the application. Functionality may also encompass customization options, integration with other software or systems, and adaptability to different user needs or environments. The effectiveness of a software application's functionality may be assessed based on how well it meets user requirements, its case of use, or its reliability in performing the intended tasks.

In some embodiments, status identification subsystem 114 may calculate the score based on security vulnerabilities of the software application. Vulnerabilities may be weaknesses or flaws that may potentially be exploited by malicious entities to gain unauthorized access, cause damage, or steal sensitive data. These vulnerabilities may arise from various sources, such as coding errors, inadequate security controls, or unpatched software components. Misconfigured servers or applications may inadvertently leave sensitive information accessible. Software may also be vulnerable to attacks targeting third-party libraries or dependencies. The impact of these vulnerabilities may range from minor disturbances to significant breaches involving data theft, financial loss, or compromised user privacy.

In some embodiments, status identification subsystem 114 may identify the score based on a resilience of the software application. For example, resilience may refer to a software application's ability to withstand and recover from failures, disruptions, or high-stress conditions. This quality may ensure that the application continues to operate effectively, even in the face of hardware malfunctions, network issues, unexpected user behavior, or cyberattacks. Resilient software may handle errors gracefully, maintaining functionality and preventing system-wide crashes or data loss. It often includes features like redundancy, where critical components are duplicated to provide a backup in case of failure. Load balancing and failover mechanisms may distribute workloads to prevent overload and seamlessly shift operations to healthy systems if one part fails. Resilience may also involve robust data backup and recovery systems, ensuring data integrity and availability. Additionally, resilient applications can adapt to changes in the environment, like varying traffic loads or evolving security threats, often employing self-healing capabilities that automatically detect and resolve issues. This resilience is crucial for maintaining user trust and ensuring continuous service, particularly in mission-critical applications where downtime can have significant consequences.

In some embodiments, a resilience of a software application may be assessed based on how long the application is inactive following a disruption to normal operation. In some embodiments, this may be the time it takes to fix or reboot the application after a disruption. Normal operation may refer to an application functioning as intended and designed without significant errors or disruptions. During normal operation, the application may consistently meet its performance benchmarks, such as response times, throughput, and efficiency. It may successfully execute tasks it was built for, such as data processing, user interaction, content management, or any other primary function. A disruption may interrupt normal operation of the application. Many circumstances could cause disruptions. For example, hardware failures, such as server crashes or storage malfunctions, may lead to loss of access or data corruption. Network issues, including outages or bandwidth limitations, may disrupt the communication between different components of a system, rendering an application inactive. Cyberattacks may overwhelm the application's resources, forcing it to become inactive. Software bugs or coding errors may trigger crashes or unresponsive behavior. Power outages or disruptions in the data center hosting the application may lead to sudden shutdowns. Additionally, external factors like natural disasters may impact the physical infrastructure supporting the software, leading to extended periods of inactivity. Each of these circumstances may disrupt normal operation of software applications.

In some embodiments, applications may include a resilience requirement, such as a level of resilience that the application must maintain. For example, outward-facing applications may be required to maintain a higher level of resilience than internal applications. A resilience requirement of an application may include a maximum length of time that the application may be inactive following a disruption to normal operation. An assessment of a resilience of an application may include testing an application's ability to withstand or overcome an intentional disruption to normal operation, as will be discussed in great detail below. Assessing the resilience may include determining the application's response to an unintentional disruption to normal operation. Status identification subsystem 114 may determine a length of time the software application is inactive following an intentional or unintentional disruption to normal operation. In some embodiments, status identification subsystem 114 may determine whether the length of time meets a resilience requirement for the software application. In some embodiments, the length of time may refer to the maximum amount of time the software application can be inactive following a disruption according to a resilience requirement of the software application.

Figure 2:
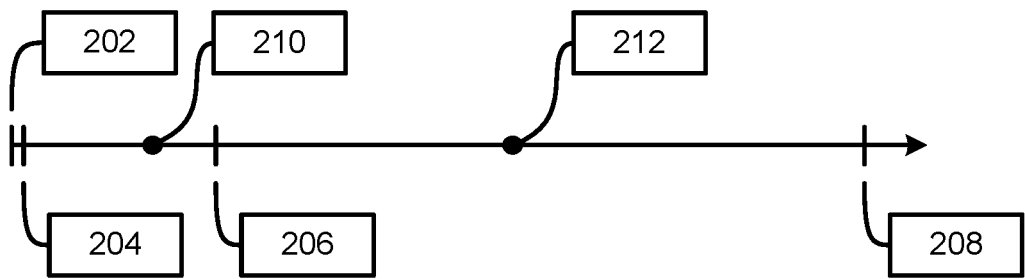
FIG. 2 illustrates a timeline of inactivity following a disruption to normal operation, in accordance with one or more embodiments.

FIG. 2 illustrates a timeline 200 of inactivity following a disruption to normal operation, in accordance with one or more embodiments. In some embodiments, timeline 200 may represent a measure of time relative to a disruption 202 to normal operation of an application. In some embodiments, disruption 202 may be intentional (e.g., as a part of resilience testing) or unintentional (e.g., occurring without prompting). In some embodiments, disruption 202 may be a starting point for determining a length of time that an application is inactive. Timeline 200 may include various resilience requirements representing maximum lengths of time that various applications are permitted to be inactive following disruption 202. For example, within status assessment system 102, applications deemed to be the most important or critical (e.g., outward-facing applications) may be required to maintain a resilience that satisfies resilience requirement 204 (e.g., a maximum period of inactivity of fifteen minutes). Less important or critical applications (e.g., important internal applications) may be required to maintain a resilience that satisfies resilience requirement 206 (e.g., a maximum period of inactivity of four hours). The least important or critical applications (e.g., less important internal applications) may be required to maintain a resilience that satisfies resilience requirement 208 (e.g., a maximum period of inactivity of twenty-four hours).

As an illustrative example, status identification subsystem 114 may calculate a period of inactivity 210 for a particular application (e.g., an application enabling customers to perform mobile transactions). Due to the importance and criticality of the application, the particular application may be associated with resilience requirement 204. Thus, the application may be noncompliant based on period of inactivity 210 exceeding resilience requirement 204. In some embodiments, status identification subsystem 114 may calculate a period of inactivity 212 for a different application (e.g., an internal chat application). Due to the lower importance and criticality of the application, the different application may be associated with resilience requirement 208. Thus, the application may be compliant based on period of inactivity 212 satisfying resilience requirement 208.

Returning to FIG. 1, status identification subsystem 114 may identify an initial status (e.g., before modification) of a software application based on a first length of time the software application is inactive following a disruption to normal operation. In some embodiments, the initial status may be a category, a numerical score, or another status. In some embodiments, the identification may be based on a single factor. For example, status identification subsystem 114 may identify the initial status based on a resilience of the application. Status identification subsystem 114 may identify the initial status based on a first length of time the application is inactive following a disruption. Status identification subsystem 114 may assess the first length of time based on a time period of the first length of time, which resilience requirement the first length of time satisfies, whether the first length of time satisfies a particular resilience factor, or another assessment.

In some embodiments, status assessment system 102 may identify the initial status based on multiple related factors. For example, status identification subsystem 114 may identify the initial status associated with the application based on the first length of time that the application is inactive based on a current number of vulnerabilities (e.g., vulnerabilities of the application before modification). The initial status may thus be based on a resilience of the application in light of the application's vulnerabilities. In some embodiments, the identification may involve a function of multiple factors. The function may be an average, a weighted average, a sum, or another function of multiple factors. For example, status identification subsystem 114 may assign first weights and second weights to the first length of time and the current number of vulnerabilities, respectively. Status identification subsystem 114 may then identify the initial status based on a weighted average of the first length of time and the current number of vulnerabilities using the first weights and the second weights. In some embodiments, status identification subsystem 114 may further account for a severity of the current vulnerabilities. In some embodiments, status identification subsystem 114 may, when calculating the score, account for a number of disruptions that have occurred within a time period. For example, status identification subsystem 114 may determine a number of disruptions that have occurred within the previous week, month, six months, year, or some other time period. In some embodiments, status identification subsystem 114 may further account for the type of disruptions (e.g., system outages, malware attack, etc.). In some embodiments, status identification subsystem 114 may further account for the software application's response to the disruptions.

In some embodiments, status identification subsystem 114 may incorporate other factors into the identification of the initial status. For example, status identification subsystem 114 may account for exceptions. In software applications, exceptions may refer to events or conditions that disrupt the normal flow of program execution. An exception might occur due to invalid user inputs, hardware failures, or logical errors in code. When an exception occurs, the software application may handle it through exception handling, which may involve logging the error, notifying the user, and safely terminating or continuing the program execution. In some embodiments, status identification subsystem 114 may account for releases. A release may be a distribution of a final version of an application or a substantial update to end users. Releases may include new features, bug fixes, performance improvements, or security patches. The process may follow a release cycle that may include phases like development, testing, staging, and deployment. In some embodiments, status identification subsystem 114 may incorporate these or other factors into identifying the initial status.

In some embodiments, the initial status may be a numerical score based on a function of one or more of the aforementioned factors. For example, status identification subsystem 114 may determine that the initial status is a score of 700 on a scale of zero to 1,000. In some embodiments, status assessment system 102 may perform an assessment of the initial score based on a number of factors. For example, software applications may be required to maintain statuses above a certain level depending on the specific application or the type of application. As an illustrative example, the application may have an initial status of 700, which may be sufficient for an outward-facing application for customer service but may not be sufficient for an outward-facing application for performing mobile transactions. If status assessment system 102 determines that an initial status is insufficient, status assessment system 102 may initiate remedial measures, such as ceasing the modification, ceasing operation of the application, or performing other actions aimed at improving the initial status of the application.

In some embodiments, to identify the initial status, status identification subsystem 114 may perform testing of the functionality, security, or other features of a software application. For example, status identification subsystem 114 may perform load or stress testing of the application. Load and stress testing of a software application may involve applying one or more load or stress conditions to assess the application's performance, stability, and capacity to handle specific demands. Load testing may simulate normal or peak usage conditions to determine how the application may perform under expected user load, focusing on metrics like response times, throughput, and resource utilization. This type of testing may reveal how well the application can handle concurrent users or high transaction volumes and may identify bottlenecks or performance degradation issues. Stress testing may push the application beyond normal operational capacities (e.g., to its breaking point) to observe how it behaves under extreme conditions. This may involve creating scenarios with excessive numbers of users, high data volumes, or limited computational resources. The goal may be to identify the application's upper limits and how it fails, whether it does so gracefully (with proper error handling and warnings) or abruptly (crashing or losing data). Stress testing may provide insights into how the application recovers from failure, its resilience, and the safeguards needed to prevent data loss or corruption during such extreme scenarios. In some embodiments, status identification subsystem 114 may apply one or more load or stress conditions to the application. Status identification subsystem 114 may identify the initial status (e.g., the first length of time) based on response times or lag times of the application under the load or stress conditions.

In some embodiments, to identify the initial status, status identification subsystem 114 may determine simulations of errors, crashes, or interruptions that may occur and apply the simulations to the application. For example, the simulations may include chaos engineering or fault injection. For example, status identification subsystem 114 may intentionally introduce faults or disruptions to observe how the application responds and recovers. For instance, simulating errors might include injecting invalid inputs or data formats to test error-handling routines and validate that the application does not crash or expose vulnerabilities. Status identification subsystem 114 may simulate crashes by abruptly terminating processes or services, helping to assess the robustness of the application's state management and its ability to recover without data loss or corruption. Status identification subsystem 114 may simulate interruptions such as network failures, database disconnections, or hardware malfunctions to ensure the application can gracefully handle and recover from such incidents. These simulations may provide insights into the application's fault tolerance capabilities, such as whether the application can switch to backup systems, redistribute loads, or queue transactions until normal operation is restored. The goal may be to identify weaknesses in the application and improve its ability to maintain functionality under adverse conditions. Status identification subsystem 114 may apply the simulations to the application and may identify the initial status (e.g., the first length of time) based on a recovery time of the application after each simulation of the one or more simulations, a functionality of the application during the one or more simulations, the functionality of the application after the one or more simulations, or other factors.

In some embodiments, to identify the initial status, status identification subsystem 114 may determine one or more simulations of security threats. For example, security threats may include data breaches, unauthorized access, or malware attacks. Status identification subsystem 114 may apply the simulations to the application. The simulations may involve creating scenarios that mimic various forms of cyberattacks or breaches, aiming to assess and enhance the application's defenses. For instance, simulating data breaches may involve attempts to unauthorizedly access or extract sensitive data. This type of simulation may test the effectiveness of data encryption, access controls, or input validation mechanisms. In the case of unauthorized access, the simulation may focus on breaching the application's security barriers without proper credentials, potentially using brute force attacks or exploiting authentication process vulnerabilities. Such testing may reveal the robustness of authentication protocols and the necessity for multi-factor authentication. Simulating malware attacks, such as ransomware or trojans, may involve introducing malicious software into the application environment to observe its impact and how the system responds. This approach may assess the efficacy of antivirus software, intrusion detection systems, and the application's ability to isolate and neutralize malicious activities. These simulations may assist status identification subsystem 114 in identifying security risks. Status identification subsystem 114 may determine the current number of vulnerabilities of the application to the security threats under these simulations.

In some embodiments, the software application may be modified. For example, software applications may consist of various components that collectively contribute to their functionality and performance. These components may include user interfaces, which allow users to interact with the application, and databases, where data is stored and managed. Backend services or server-side logic may handle the core processing and business logic of the application. Networking components may facilitate communication between the application and other systems or users over the internet or other networks. Security modules may protect the application and its data from unauthorized access and cyber threats. In addition, applications may integrate with third-party services or APIs for additional functionalities, such as payment processing or data analytics. Each of these components may operate independently yet cohesively. The modular nature of such applications may allow for easier updates and enhancements, as individual components may be modified.

Figure 3:
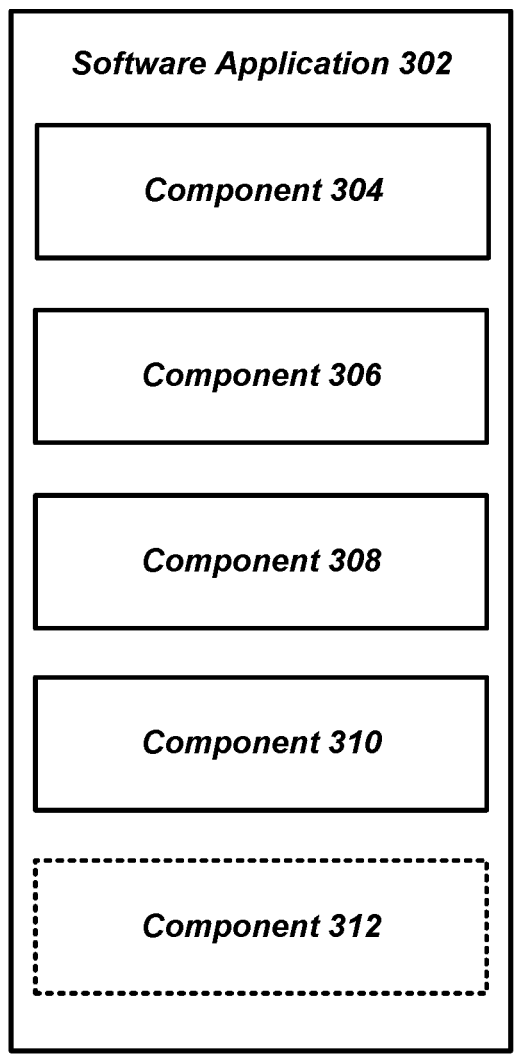
FIG. 3 illustrates a software application with multiple components, in accordance with one or more embodiments.

FIG. 3 illustrates a software application 302 with multiple components, in accordance with one or more embodiments. For example, software application 302 may be a mobile banking application that enables users to perform transactions. Component 304 may be a user interface component, which allows users to interact with the application. Component 306 may be a user authentication component involving password-based login, biometrics (e.g., fingerprint or facial recognition), or multi-factor authentication (MFA) systems. Component 308 may be a transaction processing component for handling the execution of transactions such as transfers, deposits, withdrawals, and payments. Component 310 may be a customer service component that allows users to access customer support directly from the application (e.g., via live chat, email, phone, or another method). In some embodiments, software application 302 may include component 304, component 306, component 308, and component 310 before modification to the application.

In some embodiments, status assessment system 102 (e.g., modification detection subsystem 116) may detect a modification to the software application. For example, modification detection subsystem 116 may detect that a component has been added to the application, removed from the application, updated, or otherwise modified. In some embodiments, component 312 may be a modified component. For example, software application 302 may be modified by adding component 312. As an example, component 312 may be a natural language processing (NLP) library added to software application 302 to introduce the capability to respond to customer inquiries using a chatbot that mimics human-generated text. Component 312 may be integrated with component 310 to offer additional options for customer service. This integration may require configuring the application to ensure compatibility with the added library, which may involve adjusting settings, modifying existing code, or setting up additional tools required by the library. In some embodiments, software application 302 may be modified by removing component 312, updating component 312, or otherwise making changes relating to component 312. For example, software application 302 may include component 304, component 306, component 308, component 310, and component 312 before modification to the application. The modification may involve removing, updating, or adjusting component 312.

In some embodiments, modification detection subsystem 116 may detect the modification using version control systems to track changes. For example, version control systems may provide detailed logs of when and what changes were made, along with information about who made them. For compiled components, modification detection subsystem 116 may review digital signatures, as modifications to the application may result in a different signature. Modification detection subsystem 116 may use automated testing frameworks to reveal modifications, as changes in a component may lead to different test outcomes, either failing previously passed tests or causing changes in performance benchmarks. Modification detection subsystem 116 may use monitoring tools to detect runtime changes, flagging unusual activity or performance metrics that deviate from established norms. Modification detection subsystem 116 may review internal documentation or communications within the system, as they may provide context or details about intended modifications. Modification detection subsystem 116 may rely on a combination of techniques for detecting modifications to a software application.

In some embodiments, status assessment system 102 (e.g., machine learning subsystem 118) may determine a predicted number of vulnerabilities introduced into the software application by the modification. In some embodiments, machine learning subsystem 118 may use a machine learning model trained to predict vulnerabilities introduced by modifications to software applications based on historic data. For example, the model may be trained on historic data from the system or from other systems. The historic data may include instances of modifications to applications and vulnerabilities that were introduced into the applications by the modifications.

Machine learning subsystem 118 may include or manage one or more machine learning models. Machine learning subsystem 118 may include software components, hardware components, or a combination of both. For example, machine learning subsystem 118 may include software components (e.g., API calls) that access one or more machine learning models. Machine learning subsystem 118 may access training data, for example, in memory. In some embodiments, machine learning subsystem 118 may access the training data on data node 104 or on client devices 108a-108n. In some embodiments, the training data may include entries with corresponding features and corresponding output labels or images for the entries. In some embodiments, machine learning subsystem 118 may access one or more machine learning models. For example, machine learning subsystem 118 may access the machine learning models on data node 104 or on client devices 108a-108n.

Figure 4:
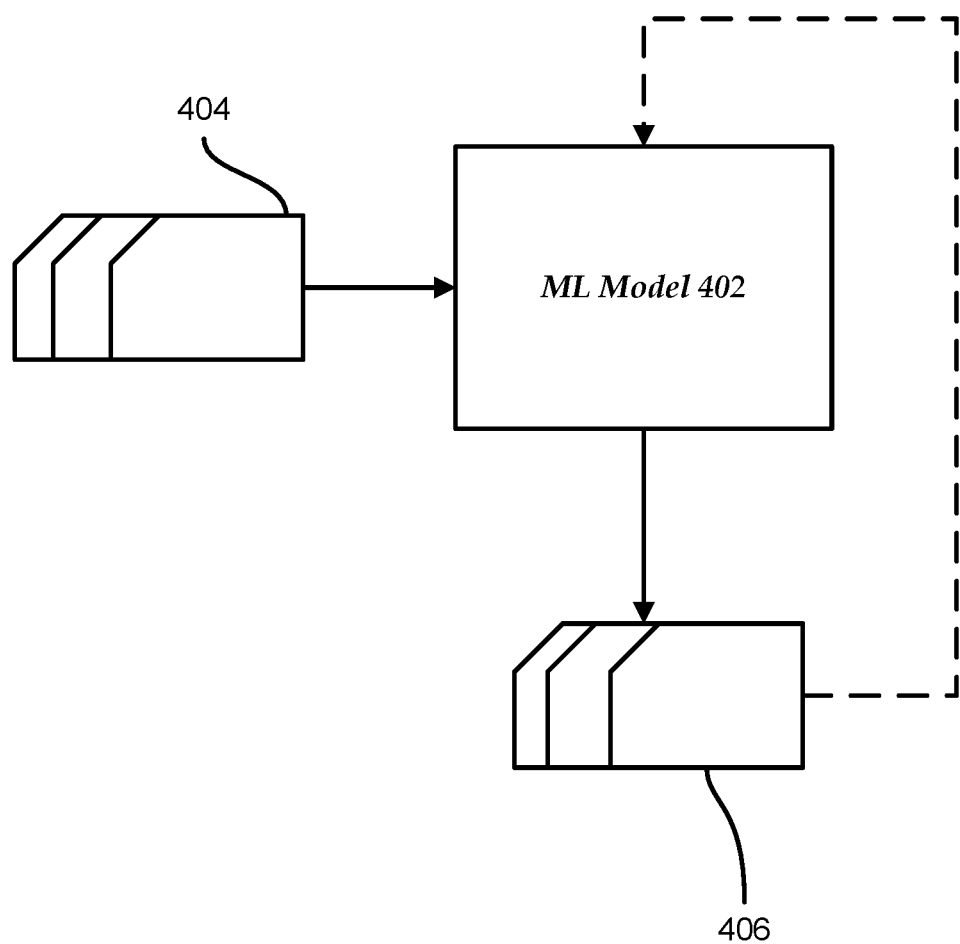
FIG. 4 illustrates an exemplary machine learning model, in accordance with one or more embodiments.

FIG. 4 illustrates an exemplary machine learning model 402, in accordance with one or more embodiments. In some embodiments, machine learning model 402 may be included in machine learning subsystem 118 or may be associated with machine learning subsystem 118. Machine learning model 402 may take input 404 (e.g., modifications to software applications) and may generate outputs 406 (e.g., vulnerabilities introduced into the software applications). The output parameters may be fed back to the machine learning model as inputs to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

In some embodiments, the modification may affect the overall resilience of the application. For example, a modification may improve the resilience. The modification may be an added component (e.g., integrating an external library). If the library is well-designed and robust, it may enhance the application's resilience by introducing more reliable or efficient code for certain functionalities. For instance, a library that offers advanced error handling or auto-recovery features may improve the application's ability to withstand and recover from disruptions. However, an added component may harm resilience of the application. For example, adding a component (e.g., integrating an external library) may introduce new dependencies, which might increase the risk of disruptions if the library is not regularly updated or if it contains undiscovered bugs. Further, if the library is incompatible with the existing components, it may lead to instability or conflicts that could compromise the application's overall resilience. In some embodiments, modification may involve removing a component. If the removed component is redundant or no longer necessary, its removal could simplify the application, leading to fewer points of failure and thus potentially enhancing the application's resilience. However, if the component plays a critical role in the application's functionality or is closely interconnected with other components, its removal may introduce instability or create gaps in the application's functionality. This could lead to a decrease in resilience, as the system may become less capable of handling errors or recovering from failures.

To determine how the modification has affected resilience of the application, status identification subsystem 114 may determine a second length of time that the software application is inactive following a disruption to normal operation. For example, status identification subsystem 114 may employ any of the methods previously discussed for testing or measuring a period of inactivity following a disruption. Status identification subsystem 114 may determine the updated resilience for the application as a whole with the modification. For example, status identification subsystem 114 may identify the second length of time based on response times or lag times of the application with the modification under one or more load or stress conditions. Status identification subsystem 114 may identify the second length of time based on a recovery time of the application with the modification after simulations of errors, crashes, or interruptions. In some embodiments, status identification subsystem 114 may identify the second length of time based on a functionality of the application with the modification during the simulations or the functionality of the application with the modification after the simulations. In some embodiments, status identification subsystem 114 may use other methods of calculating the second length of time. As an illustrative example, returning to FIG. 2, period of inactivity 210 may represent a resilience of a particular software application before a modification (e.g., adding component 312 to software application 302, as shown in FIG. 3), and period of inactivity 212 may represent the resilience of the particular software application after the modification. In this example, adding a new component has worsened the resilience of the application.

In some embodiments, status identification subsystem 114 may determine a change in resilience of the software application due to the modification. For example, status identification subsystem 114 may determine that the resilience has decreased. Based on determining that the updated resilience has decreased by a significant amount (e.g., such that the modified application no longer meets its resiliency requirement), status assessment system 102 may initiate an action. For example, status assessment system 102 may cause the application to cease operating or cease the modification, or communication subsystem 112 may trigger a notification.

In some embodiments, status identification subsystem 114 may identify an updated status reflecting the status of the application after the modification. In some embodiments, the updated status may be in a format that matches or is compatible with the format of the initial status. For example, the updated status may be an updated numerical score on a scale of zero to 1,000. In some embodiments, status identification subsystem 114 may incorporate, into the updated status, the predicted number of vulnerabilities introduced into the application by the modification. Status identification subsystem 114 may also incorporate the updated resilience (e.g., the second length of time that the software application is inactive following a disruption to normal operation). Status identification subsystem 114 may incorporate other factors into the identification of the updated status, such as those previously discussed in relation to the initial status identification. For example, status identification subsystem 114 may identify an updated status associated with the software application based on a function of the updated resilience and the predicted number of vulnerabilities. The function may be an average, a weighted average, a sum, or another function of multiple factors. For example, status identification subsystem 114 may assign first weights and second weights to the second length of time and a predicted number of vulnerabilities, respectively. Status identification subsystem 114 may then identify the updated status based on a weighted average of the second length of time and the predicted number of vulnerabilities using the first weights and the second weights.

In some embodiments, if the modification involves adding a component to the application, status identification subsystem 114 may determine the updated status based on a resiliency of the added component. For example, status identification subsystem 114 may determine a third length of time associated with the component. The third length of time may be a period of inactivity of the component following a disruption to normal operation. For example, status identification subsystem 114 may employ any of the methods previously discussed for testing or measuring a period of inactivity following a disruption. Status identification subsystem 114 may determine that the third length of time is longer than the first length of time. For example, status identification subsystem 114 may determine that the resilience of the component is worse than the resilience of the software application before the component was added. In response to determining that the third length of time is longer than the first length of time, status identification subsystem 114 may identify the updated status based on the resilience of the component. For example, status identification subsystem 114 may identify the updated status using the resilience of the component to stand in for the resilience of the overall software application once it has been modified. Status assessment system 102 may use the resilience of the component to stand in for the resilience of the overall application because a period of inactivity of any component of a software application may result in the entire software application being inactive or unavailable during that time period. Thus, the component having the lowest resilience within an application may determine the resilience of the overall application. Status identification subsystem 114 may identify the updated status based on the second length of time and the predicted number of vulnerabilities, where the second length of time is equal to the third length of time.

In some embodiments, if the modification involves adding a component to the application, status identification subsystem 114 may determine the third length of time (e.g., a period of inactivity of the component following a disruption to normal operation). Status identification subsystem 114 may determine that the third length of time is shorter than the first length of time. For example, status identification subsystem 114 may determine that the resilience of the component is better than the resilience of the software application before the component was added. In response to determining that the third length of time is longer than the first length of time, status identification subsystem 114 may identify the updated status based on the resilience of the software application before it was modified. For example, status identification subsystem 114 may identify the updated status using the initial resilience of the application (e.g., before modification) to stand in for the resilience of the overall software application once it has been modified. Status assessment system 102 may use the initial resilience of the application (e.g., before modification) to stand in for the resilience of the overall application because incorporating a component with a better resilience than the overall application may not affect the resilience of the overall application. Status identification subsystem 114 may identify the updated status based on the second length of time and the predicted number of vulnerabilities, where the second length of time is equal to the first length of time. In some embodiments, incorporating a component with a higher resilience than the overall application may affect the resilience of the overall application. In this case, status identification subsystem 114 may identify the updated resiliency of the overall software application with the modification using any of the methods discussed herein.

In some embodiments, status identification subsystem 114 may determine a status threshold for assessing a change in status based on the modification. For example, a change in status may involve a change in category (e.g., from optimal to marginal) following a modification. A change in status may involve a difference in numerical scores between the initial status and the updated status. To contextualize the change in status based on the modification, status identification subsystem 114 may compare the change to a status threshold. For example, the status threshold may be specific to the particular software application or the type of software application. A first type of software application having a lower importance may correspond to a larger threshold and a second type of software application having a higher importance may correspond to a smaller threshold. In some embodiments, the status threshold may adapt to changing circumstances, such as demand on the application or importance of the application within the overall system. The status threshold may adapt based on availability of backup applications that could handle the tasks of the software application. The status threshold may adapt based on time of day, time of year, or other time. In some embodiments, the status threshold may adapt based on other factors or based on a combination of factors. In some embodiments, status identification subsystem 114 may input one or more factors into a machine learning model trained to determine a status threshold based on current circumstances. The machine learning model may output, based on the factors at any given time, an appropriate status threshold for assessing a change in status. Thus, based on modification detection subsystem 116 detecting a modification to a software application, status identification subsystem 114 may input, into the trained model, factors describing the software application and the circumstances surrounding the software application. The model may output a threshold that accounts for these factors. In some embodiments, if, at the time of a modification and an identification of an updated status, a status change does not exceed the present adaptive threshold, the application may continue operating. In some embodiments, if shifting circumstances lead to an updated threshold at a later time (e.g., a smaller threshold) and the updated status exceeds the updated threshold, the system may cause the application to cease operations at that time.

In some embodiments, status identification subsystem 114 may compare a difference between the initial status and the updated status with the status threshold. In response to determining that a difference between the status and the updated status satisfies the status threshold, status assessment system 102 may cause the software application to cease operation. In some embodiments, communication subsystem 112 may trigger a notification indicating that the status of the software application has been compromised (i.e., that the difference has satisfied the status threshold). In some embodiments, status assessment system 102 may take one or more other remedial measures. In some embodiments, status assessment system 102 may cease the modification to the application. For example, status assessment system 102 may prevent the modification from being rolled out to users of the application. In some embodiments, status assessment system 102 may roll back the modification to a previous, stable version of the application, effectively undoing the modification. Status assessment system 102 may initiate a patch to specifically address issues introduced by the modification. In some cases, status assessment system 102 may increase its monitoring and logging activities to gather more detailed information about the issue. If the modification has led to security vulnerabilities, status assessment system 102 may enforce stricter security protocols temporarily, such as limiting access or shutting down certain functionalities until the issue is resolved. For issues impacting data integrity, status assessment system 102 may trigger data recovery processes to restore any lost or corrupted data from backups. These measures may be accompanied by testing to ensure that the remedial actions have effectively resolved the issues without introducing new problems.

Figure 5:
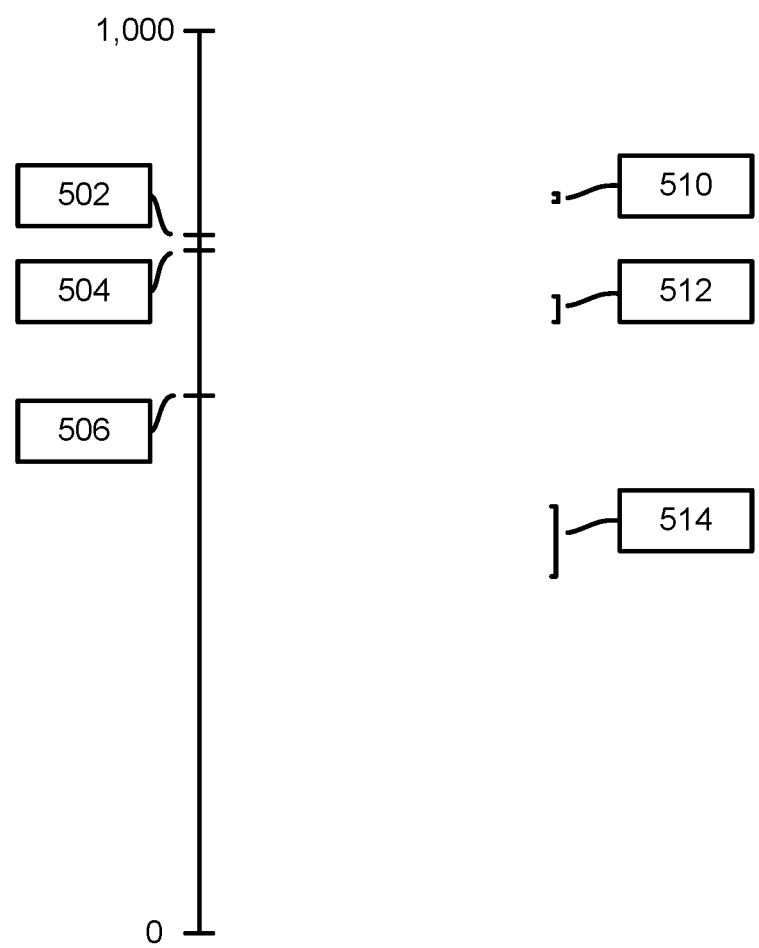
FIG. 5 illustrates a status range having adaptive thresholds, in accordance with one or more embodiments.

FIG. 5 illustrates a status range 500 having adaptive thresholds, in accordance with one or more embodiments. Status range 500 may be a scale of zero to 1,000 for numerical scores representing statuses of software applications. In some embodiments, status 502 may represent an initial status of the software application (e.g., before modification). Status 504 may represent an updated status (e.g., after modification). For example, a software application may be an application enabling customers to perform mobile transactions. The modification may include an added component (e.g., a new library integration). In some embodiments, the modification may cause the updated status to decrease to status 504. The change in status may, for example, be a change from a numerical score of 700 to a numerical score of 692. Status identification subsystem 114 may compare the change to a status threshold. In some embodiments, the threshold may be based on the type of application. Due to the application being important to the overall system and outward-facing, the threshold may be threshold 510, which is a small threshold. In some embodiments, threshold 510 may allow for changes in numerical score of 5 or less. In this example, the change from status 502 to status 504 (e.g., from 700 to 692) exceeds threshold 510. Thus, the system may cease operations of the application or may cease the modification. In some embodiments, threshold 510 may be variable. For example, as previously discussed, the threshold may adapt to changing circumstances. Thus, based on characteristics of the application, circumstances surrounding the application, outputs from a machine learning model, or other data, threshold 510 may adapt to the circumstances and may be represented by threshold 512. In some embodiments, if the applicable threshold at the time of the modification and the identification of the updated status is threshold 512, the change from status 502 to status 504 may not exceed threshold 512. In some embodiments, threshold 512 may allow for changes in numerical score of 10 or less. The change from status 502 to status 504 (e.g., from 700 to 692) may not exceed threshold 512. In this case, the application may continue operating. In some embodiments, if the circumstances lead to a change in threshold (e.g., a return to threshold 510), the system may cause the application to cease operations or cease the modification at that time.

In some embodiments, status 502 may represent an initial status of a different software application (e.g., before modification). Status 506 may represent an updated status (e.g., after modification). For example, a software application may be an internal chat application. The modification may include an added component (e.g., a new library integration). In some embodiments, the modification may cause the updated status to decrease to status 506. The change in status may, for example, be a change from a numerical score of 700 to a numerical score of 600. Status identification subsystem 114 may compare the change to a status threshold. In some embodiments, the threshold may be based on the type of application. Due to the application being internal and less important to the overall system, the threshold may be threshold 514, which is a larger threshold than threshold 510 and threshold 512. In some embodiments, the threshold may allow for changes in numerical score of 50 or less. In this example, the change from status 502 to status 506 (e.g., from 700 to 600) exceeds threshold 514. Thus, the system may cease operations of the application or may cease the modification.

In some embodiments, status identification subsystem 114 may identify a final status in certain circumstances. For example, communication subsystem 112 may receive an instruction to retire a particular software application. Retiring an application may follow a decommissioning process, which involves systematically phasing out its operations and usage. The decommissioning process may include migrating data and functionalities to other systems if necessary and ensuring that all dependencies are addressed. Status identification subsystem 114 may utilize the status of the application to determine whether the application can be retired. In some embodiments, an application cannot be retired if the application has any remaining data, components, dependencies, or other functionality. To determine whether the application is prepared for retirement, status identification subsystem 114 may determine a final status associated with the application. The final status may be based on a final resilience (e.g., a third length of time that the application is inactive at the time of receiving the instruction), a final number of vulnerabilities at the time of receiving the instruction, and any other factors incorporated into the status. In some embodiments, status assessment system 102 may only permit retirement if the final status indicates that the application is nonexistent, is equal to zero, or otherwise indicates that the application is ready for retirement. For example, based on the final status of the application having a nonzero value, communication subsystem 112 may output a notification indicating that the application cannot retire. Based on the final status of the application indicating that the application is nonexistent, equaling zero, or otherwise indicating that the application is ready for retirement, status assessment system 102 may permit retirement of the application.

Computing Environment

Figure 6:
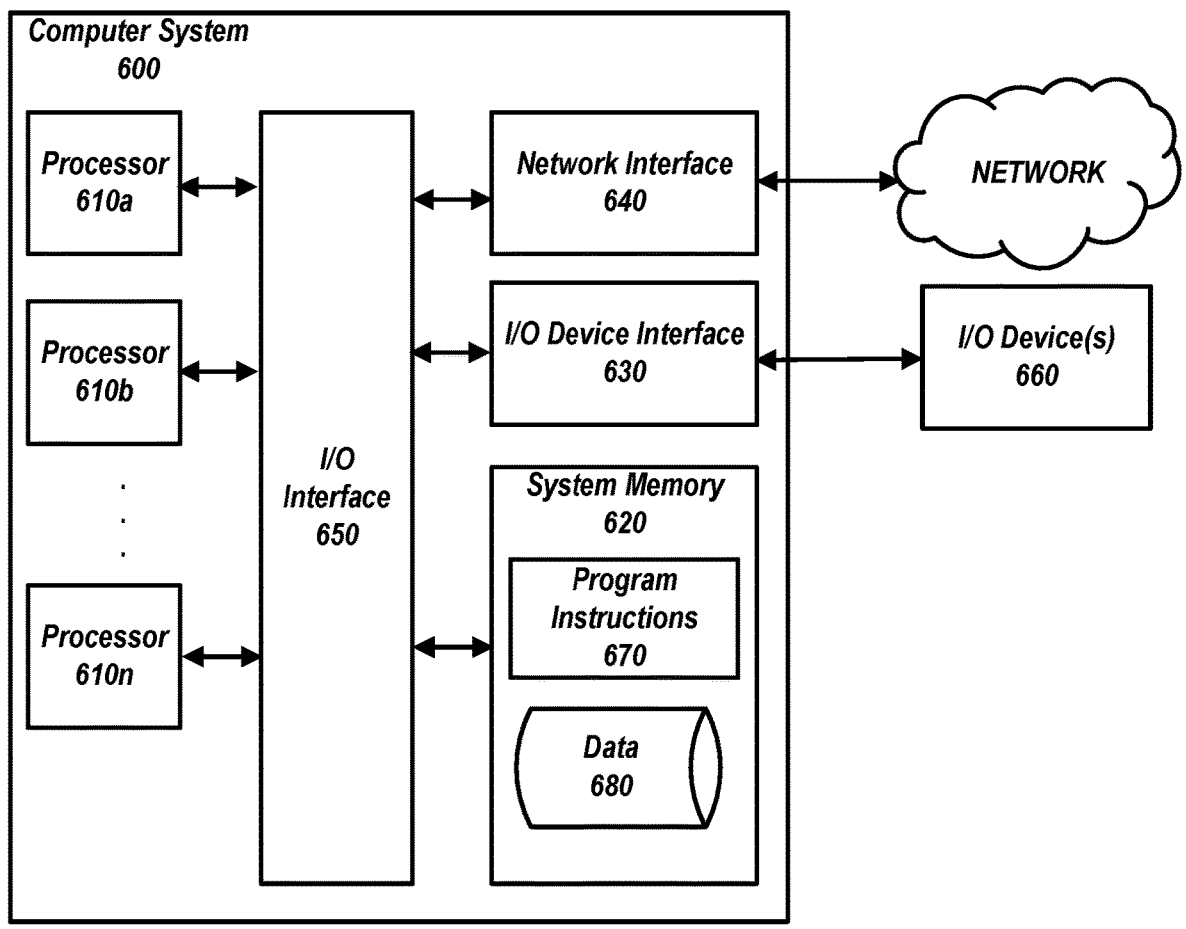
FIG. 6 illustrates a computing device, in accordance with one or more embodiments.

FIG. 6 shows an example computing system 600 that may be used in accordance with some embodiments of this disclosure. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computing system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
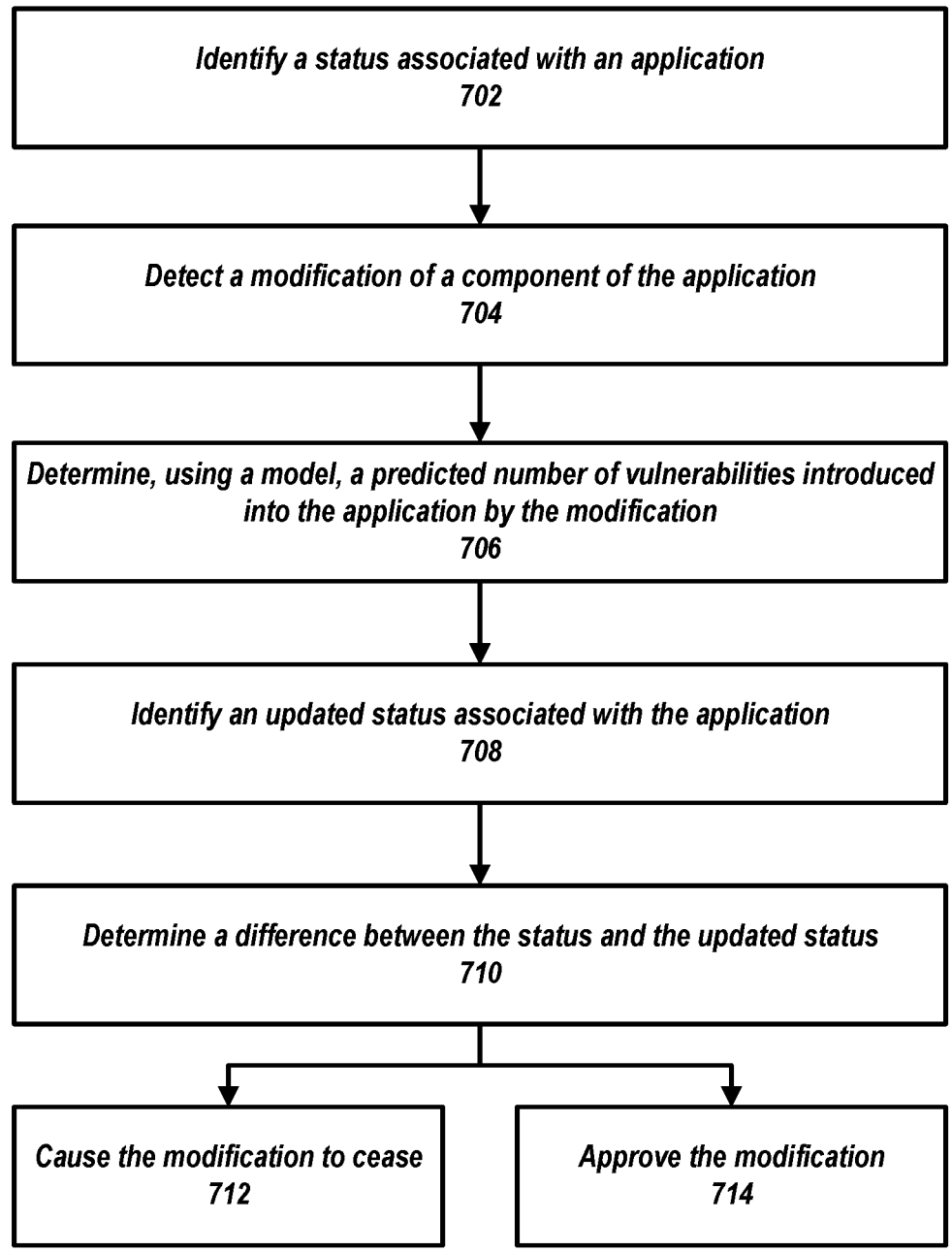
FIG. 7 shows a flowchart of the process for facilitating assessment of status changes caused by modifications to software applications, in accordance with one or more embodiments.

FIG. 7 shows a flowchart of the process 700 for facilitating assessment of status changes caused by modifications to software applications, in accordance with one or more embodiments. For example, the system may use process 700 (e.g., as implemented on one or more system components described above) to assess status changes caused by software modifications that, for example, introduce vulnerabilities to or affect resilience of the software application.

At 702, status assessment system 102 (e.g., using one or more of processors 610a-610n) may identify a status associated with an application. In some embodiments, status assessment system 102 may identify the status based on a first length of time the application is inactive following a disruption to normal operation. Status assessment system 102 may identify the status using one or more of processors 610a-610n.

At 704, status assessment system 102 (e.g., using one or more of processors 610a-610n) may detect a modification of a component of the application. For example, a modification may be an addition of a component to the application or a removal of a component from the application. In some embodiments, status assessment system 102 may detect the modification using one or more of processors 610a-610n.

At 706, status assessment system 102 (e.g., using one or more of processors 610a-610n) may determine, using a model, a predicted number of vulnerabilities introduced into the application by the modification. The machine learning model may be trained to predict vulnerabilities introduced by modifications to applications based on historic data. In some embodiments, status assessment system 102 may determine the predicted number of vulnerabilities using one or more of processors 610a-610n.

At 708, status assessment system 102 (e.g., using one or more of processors 610a-610n) may identify an updated status associated with the application. In some embodiments, status assessment system 102 may identify the updated status based on (i) a second length of time that the application is inactive following the disruption to normal operation and (ii) the predicted number of vulnerabilities generated by the machine learning model. For example, the second length of time may be different from the first length of time due to the modification to the application. In some embodiments, status assessment system 102 may identify the updated status using one or more of processors 610a-610n.

At 710, status assessment system 102 (e.g., using one or more of processors 610a-610n) may determine a difference between the status and the updated status. In some embodiments, status assessment system 102 may compare the difference to a threshold. The threshold may depend on the application or the type of application. For example, a first type of software application having a lower importance may correspond to a larger threshold, and a second type of software application having a higher importance may correspond to a smaller threshold. In some embodiments, status assessment system 102 may determine the difference between the status and the updated status using one or more of processors 610a-610n.

Based on the difference satisfying a threshold, at 712, status assessment system 102 (e.g., using one or more of processors 610a-610n) may cause the modification to cease. For example, status assessment system 102 may stop the modification or may transmit an instruction to the application to cease the modification. For example, status assessment system 102 may prevent the modification from being rolled out to users of the application. In some embodiments, status assessment system 102 may roll back the modification to a previous, stable version of the application, effectively undoing the modification. In some embodiments, status assessment system 102 may cause the modification to cease using one or more of network interface 640, I/O device interface 630, or processors 610a-610n.

Based on the difference not satisfying the threshold, at 714, status assessment system 102 (e.g., using one or more of processors 610a-610n) may approve the modification. In some embodiments, status assessment system 102 may continue or restart the application's operation with the modification or may transmit an instruction to the application to continue or restart operation with the modification. In some embodiments, status assessment system 102 may approve continued operation of the application using one or more of network interface 640, I/O device interface 630, or processors 610a-610n.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising identifying a status associated with an application based on a first length of time that the application is inactive based on a current number of vulnerabilities, detecting a modification of a component of the application, determining, using an artificial intelligence model, a predicted number of vulnerabilities introduced into the application by the modification, wherein the artificial intelligence model is trained to predict, based on historic data, numbers of vulnerabilities introduced by modifications to components of applications, identifying an updated status associated with the application based on (i) a second length of time that the application is inactive based on the modification and (ii) the predicted number of vulnerabilities, determining a difference between the status and the updated status, and based on the difference, causing the application to cease the modification.
2. The method of any one of the preceding embodiments, further comprising determining one or more load or stress conditions, and applying the one or more load or stress conditions to the application.
3. The method of any one of the preceding embodiments, further comprising identifying the first length of time based on response times or lag times of the application under the one or more load or stress conditions.
4. The method of any one of the preceding embodiments, further comprising identifying the second length of time based on response times or lag times of the application with the modification under the one or more load or stress conditions.
5. The method of any one of the preceding embodiments, further comprising determining one or more simulations of errors, crashes, or interruptions, and applying the one or more simulations to the application.
6. The method of any one of the preceding embodiments, further comprising identifying the first length of time based on one or more of a recovery time of the application after each simulation of the one or more simulations, a functionality of the application during the one or more simulations, and the functionality of the application after the one or more simulations.
7. The method of any one of the preceding embodiments, further comprising identifying the second length of time based on one or more of a recovery time of the application with the modification after each simulation of the one or more simulations, a functionality of the application with the modification during the one or more simulations, and the functionality of the application with the modification after the one or more simulations.
8. The method of any one of the preceding embodiments, further comprising determining one or more simulations of security threats, the security threats comprising one or more of data breaches, unauthorized access, and malware attacks, applying the one or more simulations of security threats to the application before the modification, and determining the current number of vulnerabilities of the application to the security threats under the one or more simulations.
9. The method of any one of the preceding embodiments, further comprising determining a threshold based on a type of the application, wherein a first type of application having a lower importance corresponds to a larger threshold and a second type of application having a higher importance corresponds to a smaller threshold.
10. The method of any one of the preceding embodiments, wherein causing the application to cease the modification based on the difference comprises determining that the difference satisfies the threshold, and in response to determining that the difference satisfies the threshold, causing the application to cease the modification.
11. The method of any one of the preceding embodiments, wherein identifying the updated status comprises assigning first weights to the second length of time and assigning second weights the predicted number of vulnerabilities, and identifying a weighted average of (i) the second length of time and (ii) the predicted number of vulnerabilities.
12. The method of any one of the preceding embodiments, wherein the modification comprises an addition of the component to the application, further comprising determining a third length of time associated with the component, determining that the third length of time is longer than the first length of time, and in response to determining that the third length of time is longer than the first length of time, identifying the updated status based on (i) the second length of time and (ii) the predicted number of vulnerabilities, wherein the second length of time is equal to the third length of time.
13. The method of any one of the preceding embodiments, wherein the modification comprises an addition of the component to the application, further comprising determining a third length of time associated with the component, determining that the third length of time is shorter than the first length of time, and in response to determining that the third length of time is shorter than the first length of time, identifying the updated status based on (i) the second length of time and (ii) the predicted number of vulnerabilities, wherein the second length of time is equal to the first length of time.
14. The method of any one of the preceding embodiments, further comprising receiving an instruction to retire the application, in response to receiving the instruction to retire the application, determining a final status associated with the application based on (i) a third length of time that the application is inactive at the time of receiving the instruction and (ii) a final number of vulnerabilities at the time of receiving the instruction, and based on the final status of the application having a nonzero value, outputting a notification indicating that the application cannot retire.
15. One or more non-transitory, machine-readable media storing instructions that, when executed by one or more data processing apparatuses, cause operations comprising those of any of embodiments 1-14.
16. A system comprising one or more processors and memory storing instructions that, when executed by the processors, cause the processors to effectuate operations comprising those of any of embodiments 1-14.
17. A system comprising means for performing any of embodiments 1-14.
18. A system comprising cloud-based circuitry for performing any of embodiments 1-14.

What is claimed is:
1. A system for assessing status changes caused by modifications to software applications, the system comprising:
    at least one processor, at least one memory, and computer-readable media having computer-executable instructions stored thereon, the computer-executable instructions, when executed by the at least one processor, causing the system to perform operations comprising:

identifying a status associated with a software application based on a first length of time the software application is inactive following a disruption to normal operation;

detecting a modification to the software application, the modification comprising an addition of a component to the software application;

determining, using a machine learning model trained to predict vulnerabilities introduced by modifications to software applications based on historic data, a predicted number of vulnerabilities introduced into the software application by the modification;

identifying an updated status associated with the software application based on a function of (i) a second length of time that the software application is inactive following the disruption to normal operation and (ii) the predicted number of vulnerabilities;

determining a status threshold based on a type of the software application, wherein a first type of software application having a lower importance corresponds to a larger threshold and a second type of software application having a higher importance corresponds to a smaller threshold; and in response to determining that a difference between the status and the updated status satisfies the status threshold, causing the software application to cease the modification.

2. A method for assessing status changes caused by modifications to software applications, the method comprising:

identifying a status associated with an application based on a first length of time that the application is inactive based on a current number of vulnerabilities;

detecting a modification of a component of the application;

determining, using an artificial intelligence model, a predicted number of vulnerabilities introduced into the application by the modification, wherein the artificial intelligence model is trained to predict, based on historic data, numbers of vulnerabilities introduced by modifications to components of applications;

identifying an updated status associated with the application based on (i) a second length of time that the application is inactive based on the modification and (ii) the predicted number of vulnerabilities;

determining a difference between the status and the updated status; and based on the difference, causing the application to cease the modification.

3. The method of claim 2, further comprising:
determining one or more load or stress conditions; and
applying the one or more load or stress conditions to the application.

4. The method of claim 3, further comprising identifying the first length of time based on response times or lag times of the application under the one or more load or stress conditions.

5. The method of claim 3, further comprising identifying the second length of time based on response times or lag times of the application with the modification under the one or more load or stress conditions.

6. The method of claim 2, further comprising:
determining one or more simulations of errors, crashes, or interruptions; and
applying the one or more simulations to the application.

7. The method of claim 6, further comprising identifying the first length of time based on one or more of a recovery time of the application after each simulation of the one or more simulations, a functionality of the application during the one or more simulations, and the functionality of the application after the one or more simulations.

8. The method of claim 6, further comprising identifying the second length of time based on one or more of a recovery time of the application with the modification after each simulation of the one or more simulations, a functionality of the application with the modification during the one or more simulations, and the functionality of the application with the modification after the one or more simulations.

9. The method of claim 2, further comprising:
determining one or more simulations of security threats, the security threats comprising one or more of data breaches, unauthorized access, and malware attacks;
applying the one or more simulations of security threats to the application before the modification; and
determining the current number of vulnerabilities of the application to the security threats under the one or more simulations.

10. The method of claim 2, further comprising determining a threshold based on a type of the application, wherein a first type of application having a lower importance corresponds to a larger threshold and a second type of application having a higher importance corresponds to a smaller threshold.

11. The method of claim 10, wherein causing the application to cease the modification based on the difference comprises:
determining that the difference satisfies the threshold; and
in response to determining that the difference satisfies the threshold, causing the application to cease the modification.

12. The method of claim 2, wherein identifying the updated status comprises:
assigning first weights to the second length of time and assigning second weights the predicted number of vulnerabilities; and
identifying a weighted average of (i) the second length of time and (ii) the predicted number of vulnerabilities.

13. The method of claim 2, wherein the modification comprises an addition of the component to the application, further comprising:
determining a third length of time associated with the component;
determining that the third length of time is longer than the first length of time; and
in response to determining that the third length of time is longer than the first length of time, identifying the updated status based on (i) the second length of time and (ii) the predicted number of vulnerabilities, wherein the second length of time is equal to the third length of time.

14. The method of claim 2, wherein the modification comprises an addition of the component to the application, further comprising:
determining a third length of time associated with the component;
determining that the third length of time is shorter than the first length of time; and
in response to determining that the third length of time is shorter than the first length of time, identifying the updated status based on (i) the second length of time and (ii) the predicted number of vulnerabilities, wherein the second length of time is equal to the first length of time.

15. The method of claim 2, further comprising:

receiving an instruction to retire the application;

in response to receiving the instruction to retire the application, determining a final status associated with the application based on (i) a third length of time that the application is inactive at the time of receiving the instruction and (ii) a final number of vulnerabilities at the time of receiving the instruction; and based on the final status of the application having a nonzero value, outputting a notification indicating that the application cannot retire.

16. One or more non-transitory, computer-readable media storing instructions that when executed by one or more processors cause the one or more processors to perform operations comprising:

identifying a status associated with an application based on a first length of time that the application is inactive based on a current number of vulnerabilities;

detecting a modification of a component of the application;

determining, using an artificial intelligence model, a predicted number of vulnerabilities introduced into the application by the modification, wherein the artificial intelligence model is trained to predict, based on historic data, numbers of vulnerabilities introduced by modifications to components of applications;

identifying an updated status associated with the application based on (i) a second length of time that the application is inactive based on the modification and (ii) the predicted number of vulnerabilities;

determining a difference between the status and the updated status; and based on the difference, causing the application to cease the modification.

17. The one or more non-transitory, computer-readable media of claim 16, wherein the instructions further cause the one or more processors to perform operations comprising:

determining one or more load or stress conditions; and applying the one or more load or stress conditions to the application.

18. The one or more non-transitory, computer-readable media of claim 17, wherein the instructions further cause the one or more processors to perform operations comprising identifying the first length of time based on response times or lag times of the application under the one or more load or stress conditions.

19. The one or more non-transitory, computer-readable media of claim 17, wherein the instructions further cause the one or more processors to perform operations comprising identifying the second length of time based on response times or lag times of the application with the modification under the one or more load or stress conditions.

20. The one or more non-transitory, computer-readable media of claim 16, wherein the instructions further cause the one or more processors to perform operations comprising:

determining one or more simulations of security threats, the security threats comprising one or more of data breaches, unauthorized access, and malware attacks;

applying the one or more simulations of security threats to the application before the modification; and determining the current number of vulnerabilities of the application to the security threats under the one or more simulations.

* * * * *